United States Patent
Oh et al.

(10) Patent No.: US 10,180,758 B2
(45) Date of Patent: Jan. 15, 2019

(54) ONE-CHIP TOUCH PANEL DRIVING DEVICE, TOUCH PANEL DEVICE INCLUDING THE SAME, AND DRIVING METHOD THEREOF

(71) Applicant: LG Display Co., Ltd., Seoul (KR)

(72) Inventors: JunSeok Oh, Seoul (KR); JongHee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 142 days.

(21) Appl. No.: 15/265,477

(22) Filed: Sep. 14, 2016

(65) Prior Publication Data

US 2017/0315670 A1 Nov. 2, 2017

(30) Foreign Application Priority Data

Apr. 29, 2016 (KR) .................. 10-2016-0053028

(51) Int. Cl.
G06F 3/041 (2006.01)
G06F 3/044 (2006.01)

(52) U.S. Cl.
CPC ............ G06F 3/0418 (2013.01); G06F 3/044 (2013.01); G06F 3/0412 (2013.01); G06F 3/0414 (2013.01); G06F 3/0416 (2013.01); G06F 2203/04105 (2013.01); G06F 2203/04106 (2013.01); G06F 2203/04111 (2013.01)

(58) Field of Classification Search
None
See application file for complete search history.

(56) References Cited

U.S. PATENT DOCUMENTS

| 8,810,263 | B1 | 8/2014 | Wilson et al. |
|---|---|---|---|
| 2012/0299866 | A1 | 11/2012 | Pao et al. |
| 2013/0038338 | A1 | 2/2013 | Lipasti et al. |
| 2015/0199061 | A1 | 7/2015 | Kitada et al. |
| 2015/0212644 | A1 | 7/2015 | Noto |
| 2015/0234446 | A1 | 8/2015 | Nathan et al. |
| 2015/0301657 | A1 | 10/2015 | Ando et al. |
| 2016/0092015 | A1 | 3/2016 | Al-Dahle et al. |

FOREIGN PATENT DOCUMENTS

| EP | 2 902 886 A1 | 8/2015 |
|---|---|---|
| PA | 10-63404 A | 3/1998 |

*Primary Examiner* — Nicholas Lee
(74) *Attorney, Agent, or Firm* — Birch, Stewart, Kolasch & Birch, LLP

(57) ABSTRACT

A touch panel driving device that can easily perform a force sensing drive with a touch drive unit and a force drive unit that can be integrally formed in one-chip, a touch panel device can include the one-chip touch panel drive device, and a driving method thereof are provided. The touch panel device can include a bypass path that supplies a second touch sensing signal to a drive unit without passing through a sensing unit. Accordingly, the touch panel device can perform both touch sensing based on a first touch sensing signal and force sensing based on a second touch sensing signal using a single drive unit and prevent an erroneous second touch sensing signal from being transmitted to the drive unit due via the sensing unit, thereby easily and more accurately performing the force sensing.

19 Claims, 7 Drawing Sheets

TD1 & TD2    TS1 & TS2 ably used. Recently, when applying a touch screen to a liquid crystal display device, a touch sensor is built in a liquid crystal panel for the purpose of making the device slimmer.

ONE-CHIP TOUCH PANEL DRIVING DEVICE, TOUCH PANEL DEVICE INCLUDING THE SAME, AND DRIVING METHOD THEREOF

CROSS REFERENCE TO RELATED APPLICATIONS

This application claims the benefit of the Korean Patent Application No. 10-2016-0053028 filed in the Republic of Korea on Apr. 29, 2016, which is hereby incorporated by reference for all purposes as if fully set forth herein.

BACKGROUND OF THE INVENTION

Field of the Invention

Embodiments of the present invention relate to a one-chip touch panel driving device, a touch panel device including the same, and a driving method thereof.

Discussion of the Related Art

A touch panel through which a user can directly input information to a screen using a finger or a pen instead of an input device such as a mouse or a keyboard which was used in the past has been used as an input device of a liquid crystal display device. Such a touch panel can be easily operated by anyone and thus more widely used. Recently, when applying a touch screen to a liquid crystal display device, a touch sensor is built in a liquid crystal panel for the purpose of making the device slimmer.

A touch panel can be classified into a resistance type, a capacitance type, an infrared sensing type, and the like. Recently, capacitance type touch panels have attracted attention due to excellent manufacturing convenience and excellent sensitivity. Capacitance type touch panels are classified into a mutual capacitance type and a self-capacitance type. Recently, touch panels that can sense not only touch position but also force applied by touch has attracted attention.

In a touch panel device according to the related art, a touch drive unit performs a touch sensing drive and a force drive unit performs a force sensing drive. The touch drive unit includes a sensing unit having a capacitor circuit. The sensing unit performs the touch sensing drive by detecting a variation in capacitance of a touch electrode formed in a touch panel. The force drive unit performs the force sensing drive by detecting a variation in resistance of a variable resistance sensor formed independently on the touch panel.

When the touch drive unit and the force drive unit are separately formed, there are problems with an increase in volume of the touch panel device and an increase in manufacturing cost. However, when the touch drive unit and the force drive unit are integrally formed, other problems exist, in which it is difficult to detect a variation in resistance of the variable resistance sensor in the sensing unit, making it difficult to perform the force sensing drive.

SUMMARY OF THE INVENTION

An embodiment of the present invention provides a one-chip touch panel driving device that can easily perform a force sensing drive with a touch drive unit and a force drive unit that are integrally formed as a single unit, a touch panel device including the one-chip touch panel driving device, and a driving method thereof.

According to an embodiment of the present invention, there is provided a touch panel device including: a touch panel in which plural first touch electrodes for sensing a touch position and plural second touch electrodes for sensing a touch force are arranged; and a touch panel driving device that receives a first touch sensing signal from the plural first touch electrodes by supplying a first touch driving signal to the plural first touch electrodes and receives a second touch sensing signal from the plural second touch electrodes by supplying a second touch driving signal to the plural second touch electrodes.

According to an embodiment of the present invention, there is provided a touch panel driving device including: a drive unit that outputs a first touch driving signal to plural first touch electrodes, outputs a second touch driving signal to plural second touch electrodes, and is supplied with a first touch sensing signal and a second touch sensing signal; a switching unit that supplies the first touch sensing signal to the drive unit via a sensing unit or supplies the second touch sensing signal to the drive unit via a bypass path not passing through the sensing unit; and a control unit that senses a touch position using the first touch sensing signal, senses a touch pressure using the second touch sensing signal, and controls operations of the drive unit and the switching unit.

The touch panel device according to an embodiment of the present invention includes a bypass path that a second touch sensing signal to a drive unit without passing through a sensing unit. Accordingly, the touch panel device according to an embodiment of the present invention can perform both the touch sensing based on the first touch sensing signal and the force sensing based on the second touch sensing signal using a single drive unit and can prevent an erroneous second touch sensing signal from being transmitted to the drive unit due to the sensing unit, thereby easily performing the force sensing.

BRIEF DESCRIPTION OF THE DRAWINGS

The accompanying drawings, which are included to provide a further understanding of the disclosed subject matter and are incorporated in and constitute a part of this application, illustrate embodiments of the disclosed subject matter and together with the description serve to explain the principle of the disclosed subject matter. In the drawings.

DETAILED DESCRIPTION

Figure 1:
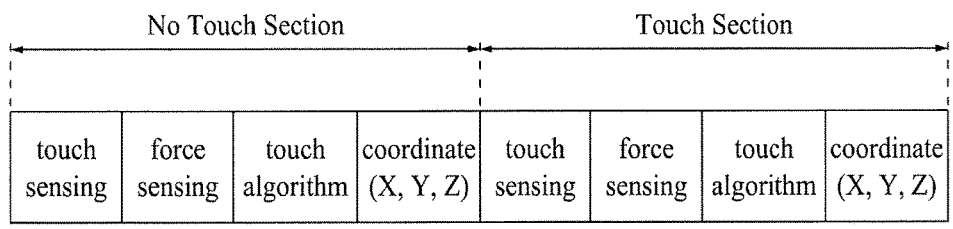
FIG. 1 is a diagram illustrating drive modes by sections of a touch panel device according to an embodiment of the invention.

Advantages and features of the invention and methods for achieving the advantages or features will be apparent from embodiments described below in detail with reference to the accompanying drawings. However, the invention is not limited to the embodiments but can be modified in various forms. The embodiments are provided merely for completing the disclosure of the invention and are provided for completely informing those skilled in the art of the scope of the invention. The scope of the invention is defined by only the appended claims.

Shapes, sizes, ratios, angles, number of pieces, and the like illustrated in the drawings, which are provided for the purpose of explaining the embodiments of the invention, are exemplary and thus the invention is not limited to the illustrated details. In the following description, like elements are referenced by like reference numerals. When it is determined that detailed description of the relevant known functions or configurations involved in the invention makes the gist of the invention obscure, the detailed description thereof will not be made.

When "include," "have," "be constituted," and the like are mentioned in the specification, another element may be added unless "only" is used. A singular expression of an element includes two or more elements unless differently mentioned.

In construing elements, an error range is included even when explicit description is not made.

For example, when positional relationships between two parts are described using "on," "over," "under," "next" and the like, one or more other parts may be disposed between the two parts unless "just" or "direct" is used.

For example, when temporal relationships are described using "after," "subsequent to," "next," "before," and the like, such expression may include temporal discontinuity unless "immediately" or "directly" is used.

Terms "first," "second," and the like can be used to describe various elements, but the elements should not be limited to the terms. The terms are used only to distinguish an element from another. Therefore, a first element may be a second element within the technical spirit of the invention.

An "X-axis direction," a "Y-axis direction," and a "Z-axis direction" should not be construed as a geometrical perpendicular relationship and may refer to wider directivity within a range in which the configuration of the present invention can functionally operate.

The term "at least one" should be understood to include all possible combinations of one or more relevant items. For example, "at least one of a first item, a second item, and a third item" individually means the first item, the second time, or the third item and also means all possible combinations of two or more of the first item, the second item, and the third item.

Features of the embodiments of the invention can be coupled or combined partially or on the whole and can be technically interlinked and driven in various forms. The embodiments may be put into practice independently or in combination.

Hereinafter, a touch panel device according to an exemplary embodiment of the present invention will be described in detail with reference to the accompanying drawings.

FIG. 1 is a diagram illustrating drive modes by sections of a touch panel device 100 according to an embodiment of the invention.

The touch panel device 100 performs a touch position sensing operation and a touch force sensing operation by sections. In a touch sensing section, it is sensed whether a touch panel 110 is touched. In a force sensing section, a force applied to the touch panel 110 is sensed. In a touch algorithm section, sensing information is generated on the basis of information on whether the touch panel 110 is touched and the force applied to the touch panel 110. In a coordinate section, a position of the touch panel 110 which is touched or to which a force is applied is measured using the sensing information.

Figure 2:
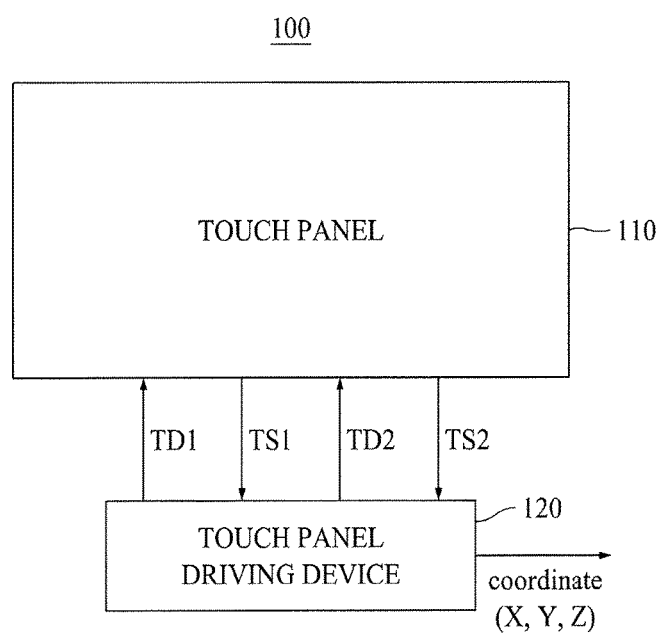
FIG. 2 is a diagram illustrating a touch panel device according to an embodiment of the present invention.

FIG. 2 is a diagram illustrating the touch panel device 100 according to an embodiment of the present invention.

The touch panel device 100 according to an embodiment of the present invention includes a touch panel 110 in which a first touch sensor for detecting a touch position (coordinate) and a second touch sensor for detecting a touch force are formed and a touch panel driving device 120 that drives the touch panel 110.

The touch panel 110 may include a display panel that displays an image. The display panel may employ a liquid crystal panel or an OLED panel.

For example, when a liquid crystal panel is used as the display panel, the display panel includes a TFT array substrate, a color filter array substrate, and a backlight unit that supplies light to the liquid crystal panel.

When the touch panel 110 includes the display panel, the touch panel device may further include a display driving device for displaying an image. The display driving device supplies data signals and control signals to plural pixels of the display panel to display an image. The display driving device includes a gate drive IC, a data drive IC, and a timing controller.

The entire or partial configuration of the display driving device may be formed in the touch panel 110 in a chip-on-glass (COG) manner or a chip-on-flexible printed circuit board or chip-on-film (COF) manner.

Figure 3A:
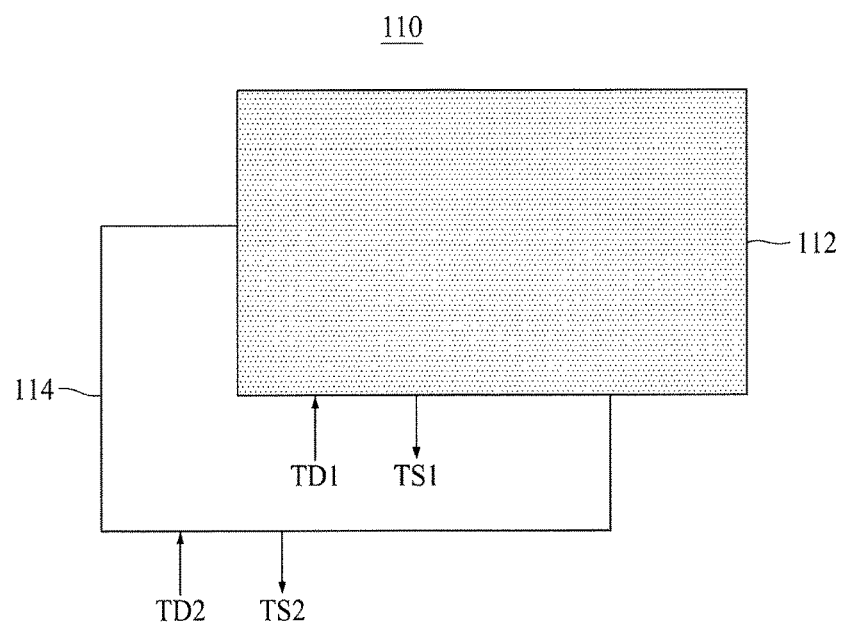
FIGS. 3A to 3C are diagrams illustrating a touch panel according to an embodiment of the present invention.
Figure 3B:
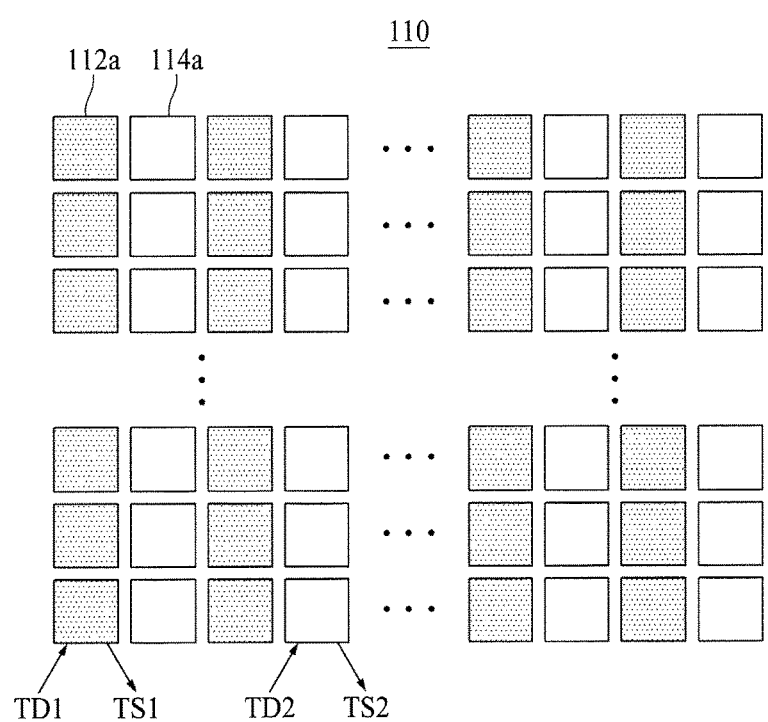
Figure 3C:
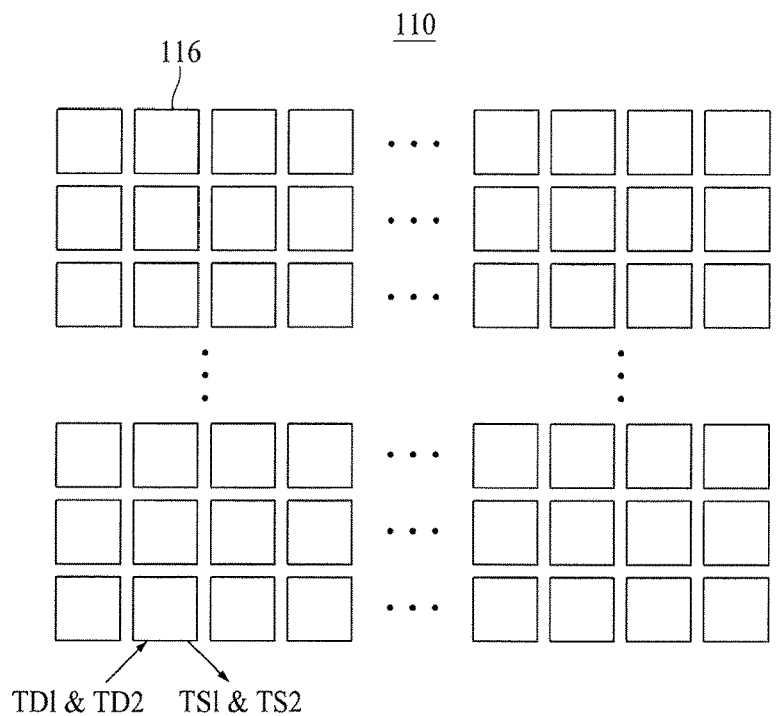

FIGS. 3A to 3C are diagrams illustrating the touch panel 110 according to an embodiment of the present invention.

Referring to FIG. 3A, the touch panel 110 includes a first touch layer 112 in which plural first touch sensors for sensing a touch and a touch position are arranged and a second touch layer 114 in which plural second touch sensors for sensing a force applied at the time of touch are arranged.

The first touch sensors arranged in the first touch layer 112 are supplied with a first touch driving signal TD1. A touch and a touch position can be sensed using a first touch sensing signal TS1 output from the first touch sensors.

The second touch sensors arranged in the second touch layer 114 are supplied with a second touch driving signal TD2. The touch force can be sensed using a second touch sensing signal TS2 output from the second touch sensors.

FIG. 3A illustrates an example in which the first touch layer 112 is disposed above the second touch layer 114. However, the present invention is not limited to this configuration. The positions of the first touch layer 112 and the second touch layer 114 can be changed.

Each of the plural first touch sensors serves to sense a user's touch position on the first touch layer 112 and may be a capacitor, for example, a mutual capacitor, which is formed between plural first touch drive lines and plural first touch sensing electrodes. The mutual capacitance of each of the plural touch sensors can vary depending on a variation in distance between the first touch drive line and the first touch sensing electrode based on a user's touch or may vary depending on whether a user's finger (or a conductive object) touches the first touch layer 112. The plural first touch drive lines and the plural first touch sensing electrodes in an embodiment may be line patterns extending long or plural electrode patterns connected to each other via bridges. Here, the first touch drive lines and the first touch sensing lines may be arranged to cross each other vertically or may be arranged in the same plane, adjacent to each other.

Alternatively, each of the plural first touch sensors may be a capacitor, for example, a self-capacitance capacitor, which is formed in each of the plural touch electrodes. In this instance, the self-capacitance of each of the plural first touch sensors can vary depending on a touch of a user finger (or a conductive object) on the touch electrode.

Each of the plural second touch sensors serves to sense a user's touch force on the second touch layer 114 and may be a resistor which is formed between the corresponding second touch drive line and the corresponding second touch sensing electrode. The resistance value of the second touch sensor can vary depending on a contact area between the second touch drive line and the second touch sensing electrode corresponding to the user's touch on the second touch layer 114, that is, a touch force (or a contact load).

For example, the second touch layer 114 may include plural second touch drive lines which are disposed on a first base board, plural second touch sensing lines which are disposed on a second base board, an elastic resistor which is disposed between the first base board and the second base board, and a spacer which maintains a gap between the first base board and the second base board.

Each of the plural second touch sensors is disposed in the elastic resistor disposed between the second touch drive line and the second touch sensing electrode which cross each other and has a resistance value corresponding to the contact area between the second touch drive line and the second touch sensing electrode which come in contact with the elastic resistor.

Referring to FIG. 3B, the plural touch sensing electrodes 112a for sensing a touch and a touch position and the plural force sensing electrodes 114a for sensing a touch force may be arranged in the same layer.

The plural touch sensing electrodes 112a are supplied with a first touch driving signal TD1, and a touch and a touch position can be sensed in response to a first touch sensing signal TS1 from the plural touch sensing electrodes 112a.

The plural force sensing electrodes 114a are supplied with a second touch driving signal TD2, and a touch force can be sensed in response to a second touch sensing signal TS2 from the plural force sensing electrodes 114a.

In order to enhance accuracy of the position sensing and the force sensing, the number of touch sensing electrodes 112a and the number of force sensing electrodes 114a can be set to be equal to each other. However, the present invention is not limited to this configuration, and the touch sensing electrodes 112a more than the force sensing electrodes 114a may be provided when it is intended to raise touch sensitivity. Further, when it is intended to raise force sensitivity, the force sensing electrodes 114a more than the touch sensing electrodes 112a may be provided.

Referring to FIG. 3C, plural touch electrodes 116 are arranged in one layer and both the position sensing and the force sensing can be performed using the plural touch electrodes 116.

In this instance, a touch section is divided into a first period (position sensing period) and a second period (force sensing period) to perform the touch position sensing and the touch force sensing.

In the first period, the plural touch electrodes 116 are supplied with the first touch driving signal TD1 and a touch and a touch position can be sensed in response to the first touch sensing signal TS1 from the plural touch electrodes 116.

In the second period, the plural touch electrodes 116 are supplied with the second touch driving signal TD2 and a touch force can be sensed in response to the second touch sensing signal TS2 from the plural touch electrodes 116.

However, the present invention is not limited to this configuration. For example, in the first period, the plural touch electrodes 116 may be supplied with the second touch driving signal TD2 and a touch force may be sensed in response to the second touch sensing signal TS2 from the plural touch electrodes 116. In the second period, the plural touch electrodes 116 may be supplied with the first touch driving signal TD1 and a touch and a touch position may be sensed in response to the first touch sensing signal TS1 from the plural touch electrodes 116.

Figure 4:
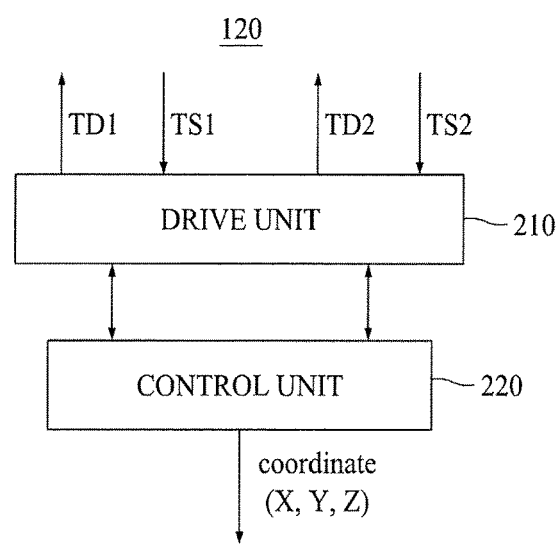
FIG. 4 is a diagram illustrating a touch panel driving device according to an embodiment of the present invention.

FIG. 4 is a diagram illustrating the touch panel driving device 120 according to an embodiment of the present invention.

Hereinafter, description will be made with reference to FIGS. 3A and 3B in addition to FIG. 4.

The touch panel driving device 120 includes a drive unit 210 and a control unit 220.

The drive unit 210 supplies the first touch driving signal TD1 to the plural touch sensing electrodes 112a arranged in the touch panel 110. The first touch driving signal TD1 is a signal for sensing a touch and a touch position. The drive unit 210 receives the first touch sensing signals TS1 from the plural touch sensing electrodes 112a. The drive unit 210 transmits the first touch sensing signals TS1 received from the plural first touch electrodes 112a to the control unit 220.

The drive unit 210 supplies the second touch driving signal TD2 to the plural force sensing electrodes 114a arranged in the touch panel 110. The second touch driving signal TD2 is a signal for sensing a touch pressure. The drive unit 210 receives the second touch sensing signals TS2 from the plural force sensing electrodes 114a. The drive unit 210 transmits the second touch sensing signals TS2 received from the plural second touch electrodes 114a to the control unit 220.

The control unit 220 generates a drive unit control signal for controlling driving of the drive unit 210 and controls the drive unit 210 so as to generate the first touch driving signal TD1 or the second touch driving signal TD2 using the generated drive unit control signal.

The control unit 220 collects and analyzes the first touch sensing signals TS1 supplied from the drive unit 210 and calculates a touch and a touch position. The control unit 220 collects and analyzes the second touch sensing signals TS2 supplied from the drive unit 210 and senses a touch pressure (or a force level) of a user's touch on the touch panel. Selectively, the first touch sensing signals TS1 and the second touch sensing signals TS2 can be directly supplied to the control unit 220 without passing through the drive unit 210.

The touch panel driving device 120 can be connected to the touch panel 110 via a flexible printed circuit (FPC).

Hereinafter, description will be made with reference to FIG. 3C in addition to FIG. 4.

The drive unit 210 supplies the first touch driving signal TD1 to the plural touch electrodes 116 arranged in the touch panel 110. The drive unit 210 supplies the second touch driving signal TD2 to the plural touch electrodes 116 arranged in the touch panel 110.

Since a touch, a touch position, and a touch force are sensed using a single touch electrode 116, the touch period should be divided and the touch sensing and the force sensing should be performed. For this purpose, the touch period is divided into the first period (position sensing period) and the second period (force sensing period).

In the first period, the drive unit 210 supplies the first touch driving signal TD1 to the plural touch electrodes 116. The drive unit 210 receives the first touch sensing signals TS1 from the plural touch electrodes 116 and senses a touch and a touch position.

In the second period, the drive unit 210 supplies the second touch driving signal TD2 to the plural touch electrodes 116. The drive unit 210 receives the second touch sensing signals TS2 from the plural touch electrodes 116 and senses a touch force.

In this way, both the touch sensing and the force sensing can be performed using a single touch electrode 116. The drive unit 210 generates the first touch driving signal TD1 or the second touch driving signal TD2 on the basis of a control signal from the control unit 220. The control unit 220 generates and outputs resultant values of the touch, the position sensing, and the force sensing.

Figure 5:
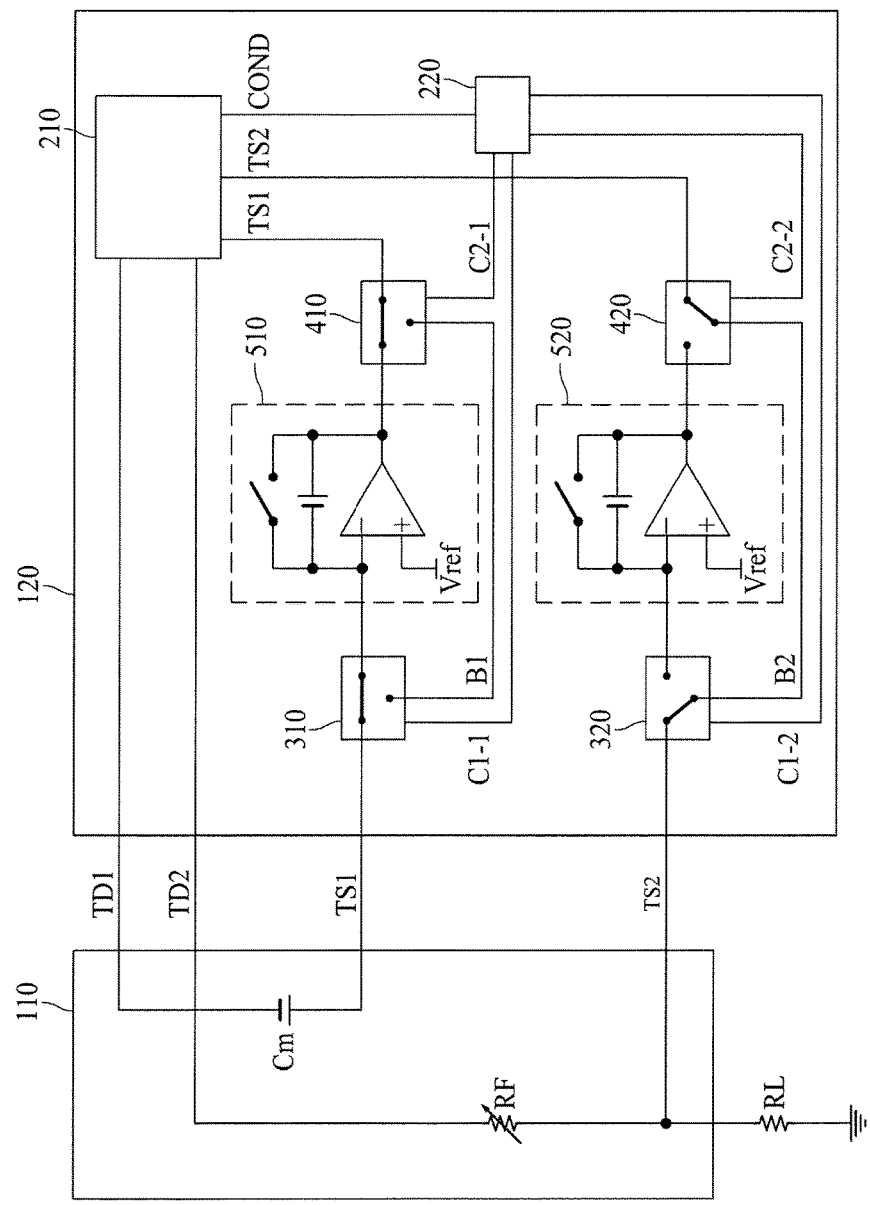
FIG. 5 is a block diagram illustrating the touch panel device according to an embodiment of the present invention.

FIG. 5 is a block diagram specifically illustrating a touch panel device 100 according to an embodiment of the present invention.

The touch panel device 100 according to this embodiment of the present invention includes a touch panel 110 and a touch panel driving device 120. Since the touch panel 110 according to an embodiment of the present invention has the same configuration and operation as the touch panel 110 described with reference to FIGS. 3A to 3C and the touch panel driving device 120 according to an embodiment of the present invention has the same configuration and operation as the touch panel driving device 120 described with reference to FIG. 4, description thereof will not be repeatedly made. The touch panel driving device 120 according to an embodiment of the present invention includes a drive unit 210, a control unit 220, first switching units 310 and 320, second switching units 410 and 420, sensing units 510 and 520, and bypass paths B1 and B2.

The drive unit 210 outputs a first touch driving signal TD1 to the plural first touch sensors. Each of the first touch sensor can be modeled by a capacitor Cm disposed in the touch panel 110. Here, capacitance of the capacitor Cm varies depending on whether a touch is made, and the first touch sensing signal TS1 is generated on the basis of the capacitance of the first touch sensor.

The drive unit 210 outputs the second touch driving signal to the plural second touch sensors. Each of the plural second touch sensors can be modeled by a variable resistor RF disposed in the touch panel 110. Resistance of the variable resistor RF of the second touch electrode having received a touch pressure varies. With the variation in resistance of the variable resistor RF, a resistance ratio of the variable resistor RF and a load resistor RL also varies. The second touch sensor generates the second touch sensing signal TS2 on the basis of the varying resistance ratio of the variable resistor RF and the load resistor RL.

The drive unit 210 is supplied with the first touch sensing signals TS1 and the second touch sensing signals TS2. The drive unit 210 supplies the first touch sensing signals TS1 and the second touch sensing signals TS2 to the control unit 220.

The control unit 220 calculates a touch position using the first touch sensing signals TS1. That is, the control unit 220 collects and analyzes the first touch sensing signals TS1 sensed by the drive unit 210 and calculates a touch and a touch position.

The control unit 220 calculates a touch pressure using the second touch sensing signals TS2. That is, the control unit 220 collects and analyzes the second touch sensing signals TS2 sensed by the drive unit 210 and calculates a pressure applied to the touched electrode.

The control unit 220 controls the operation of the drive unit 210. That is, the control unit 220 adjusts the drive time of the drive unit 210 using the drive unit control signal COND and controls the drive unit so as to generate the first touch driving signal TD1 or the second touch driving signal TD2 using the control signal.

The control unit 220 controls operations of the first switching units 310 and 320 and the second switching units 410 and 420. When a touch and a touch position are calculated, the control unit 220 supplies a (1-1)-th control signal C1-1 to the first switching units 310 and 320 and supplies a (2-1)-th control signal C2-1 to the second switching units 410 and 420 so as to supply the first touch sensing signals TS1 to the drive unit 210 via the sensing units 510 and 520. When a touch pressure is sensed, the control unit 220 supplies a (1-2)-th control signal C1-2 to the first switching units 310 and 320 and supplies a (2-2)-th control signal C2-2 to the second switching units 410 and 420 so as to transmit the second touch sensing signals TS2 to the drive unit 210 or the control unit 220 via the bypass paths B1 and B2. Bypass paths B1 and B2 does not pass through the sensing units 510 and 520.

The first switching units 310 and 320 are supplied with the first touch sensing signal TS1 from the first touch electrode or are supplied with the second touch sensing signal TS2 from the second touch electrode. In FIG. 5, one first switching unit 310 is supplied with the first touch sensing signal TS1 and the other first switching unit 320 is supplied with the second touch sensing signal TS2, but the present invention is not limited to this configuration. The first switching unit 310 may be supplied with the second touch sensing signal TS2 and the other first switching unit 320 may be supplied with the first touch sensing signal TS1, both the first switching units 310 and 320 may be supplied with the first touch sensing signal TS1, or both the first switching units 310 and 320 may be supplied with the second touch sensing signal TS2.

When the first switching units 310 and 320 are supplied with the first touch sensing signal TS1, the first switching units 310 and 320 are connected to input terminals of the sensing units 510 and 520 in response to the (1-1)-th control signal C1-1 supplied from the control unit 220. The sensing units 510 and 520 adjust an output timing of the first touch sensing signal TS1 or amplify the first touch sensing signal TS1 and then transmit the first touch sensing signal TS1 to the second switching units 410 and 420.

When the first switching units 310 and 320 are supplied with the second touch sensing signal TS2, the first switching units 310 and 320 are connected to ends of the bypass paths B1 and B2 in response to the (1-2)-th control signal C1-2 supplied from the control unit 220. The bypass paths B1 and B2 transmit the second touch sensing signal TS2 to the second switching units 410 and 420 without passing through the sensing units 510 and 520.

The second switching units 410 and 420 are supplied with the first touch sensing signal TS1 of which the output timing has been adjusted or which is inversely amplified from the sensing units 510 and 520 or are supplied with the second touch sensing signal TS2 from the bypass paths B1 and B2. In FIG. 5, one second switching unit 410 is supplied with the first touch sensing signal TS1 and the other second switching unit 420 is supplied with the second touch sensing signal TS2, but the present invention is not limited to this configuration. One second switching unit 410 may be supplied with the second touch sensing signal TS2 and the other second switching unit 420 may be supplied with the first touch sensing signal TS1, both the second switching units 410 and 420 may be supplied with the first touch sensing signal TS1, or both the second switching units 410 and 420 may be supplied with the second touch sensing signal TS2.

When the first switching units 410 and 420 are supplied with the (1-1)-th control signal C1-1, the second switching units 410 and 420 are connected output terminals of the sensing units 510 and 520 in response to the (2-1)-th control signal C2-1 supplied from the control unit 220. The second switching units 410 and 420 transmit the first touch sensing signal TS1 to the drive unit 210 or the control unit 220.

When the first switching units 410 and 420 are supplied with the (1-2)-th control signal C1-2, the second switching units 410 and 420 are connected the other ends of the bypass paths B1 and B2 in response to the (2-2)-th control signal C2-2 supplied from the control unit 220. The second switching units 410 and 420 transmit the second touch sensing signal TS2 to the drive unit 210 or the control unit 220.

In FIG. 5, the first touch electrode and the second touch electrode are separately disposed, but the present invention is not limited to this configuration. A touch, a touch position, and a touch force can be sensed using a single touch electrode. In this instance, a touch period is divided into a first period (position sensing period) and a second period (force sensing period). The first switching units 310 and 320 and the second switching units 410 and 420 transmit the first touch sensing signal TS1 to the drive unit 210 or the control unit 220 in response to the (1-1)-th control signal C1-1 and the (2-1)-th control signal C2-1 supplied from the control unit 220 so as to perform touch sensing in the first period (touch sensing period). The first switching units 310 and 320 and the second switching units 410 and 420 transmit the second touch sensing signal TS2 to the drive unit 210 or the control unit 220 in response to the (2-1)-th control signal C2-1 and the (2-2)-th control signal C2-2 supplied from the control unit 220 so as to perform touch sensing in the second period (force sensing period).

The sensing units 510 and 520 are supplied with the first touch sensing signal TS1 and are supplied with a reference voltage Vref of a predetermined level. The sensing units 510 and 520 can adjust the output timing of the first touch sensing signal TS1 using a capacitor and a switch circuit therein. The sensing units 510 and 520 can amplify the first touch sensing signal TS1 using an operational amplifier therein. The sensing units 510 and 520 output the first touch sensing signal TS1 of which the output timing has been adjusted or which has been amplified to the second switching units 410 and 420.

The bypass paths B1 and B2 transmit the second touch sensing signal TS2 generated from the second touch electrode from the first switching units 310 and 320 to the second switching units 410 and 420 without passing through the sensing units 510 and 520. Since the second touch sensing signal TS2 has a larger variation width than the first touch sensing signal TS1, it is not easy to control the second touch sensing signal TS2 using the capacitors and the switch circuits in the sensing units 510 and 520. When the second touch sensing signal TS2 generated on the basis of the variation of the variable resistance passes through the sensing units 510 and 520 including the capacitor therein, there is a problem in that an erroneous second touch sensing signal TS2 is transmitted to the drive unit 210. The bypass paths B1 and B2 enable the second touch sensing signal TS2 to be supplied to the drive unit 210 or the control unit 220 without passing through the sensing units 510 and 520.

The touch panel device 100 according to an embodiment of the present invention includes the bypass paths B1 and B2 that transmit the second touch sensing signal TS2 to the drive unit 210 without passing through the sensing units 510 and 520. Accordingly, the touch panel device 100 according to an embodiment of the present invention can perform both the touch sensing using the first touch sensing signal TS1 and the force sensing using the second touch sensing signal TS2 through the use of the single drive unit 210 and can prevent the erroneous second touch sensing signal TS2 from being transmitted to the drive unit 210 or the control unit 220 due to the sensing units 510 and 520.

The touch panel device 100 according to an embodiment of the present invention includes the first switching units 310 and 320 that are connected to ends of the bypass paths B1 and B2 in response to the (2-1)-th control signal C2-1 and the second switching units 410 and 420 that are connected to the other ends of the bypass paths B1 and B2 in response to the (2-2)-th control signal C2-2. Accordingly, the touch panel device 100 according to an embodiment of the present invention can easily transmit the second touch sensing signal TS2 via the bypass paths B1 and B2 without adding a particular element and thus can reduce a volume and a manufacturing cost of the touch panel driving device 120.

Figure 6:
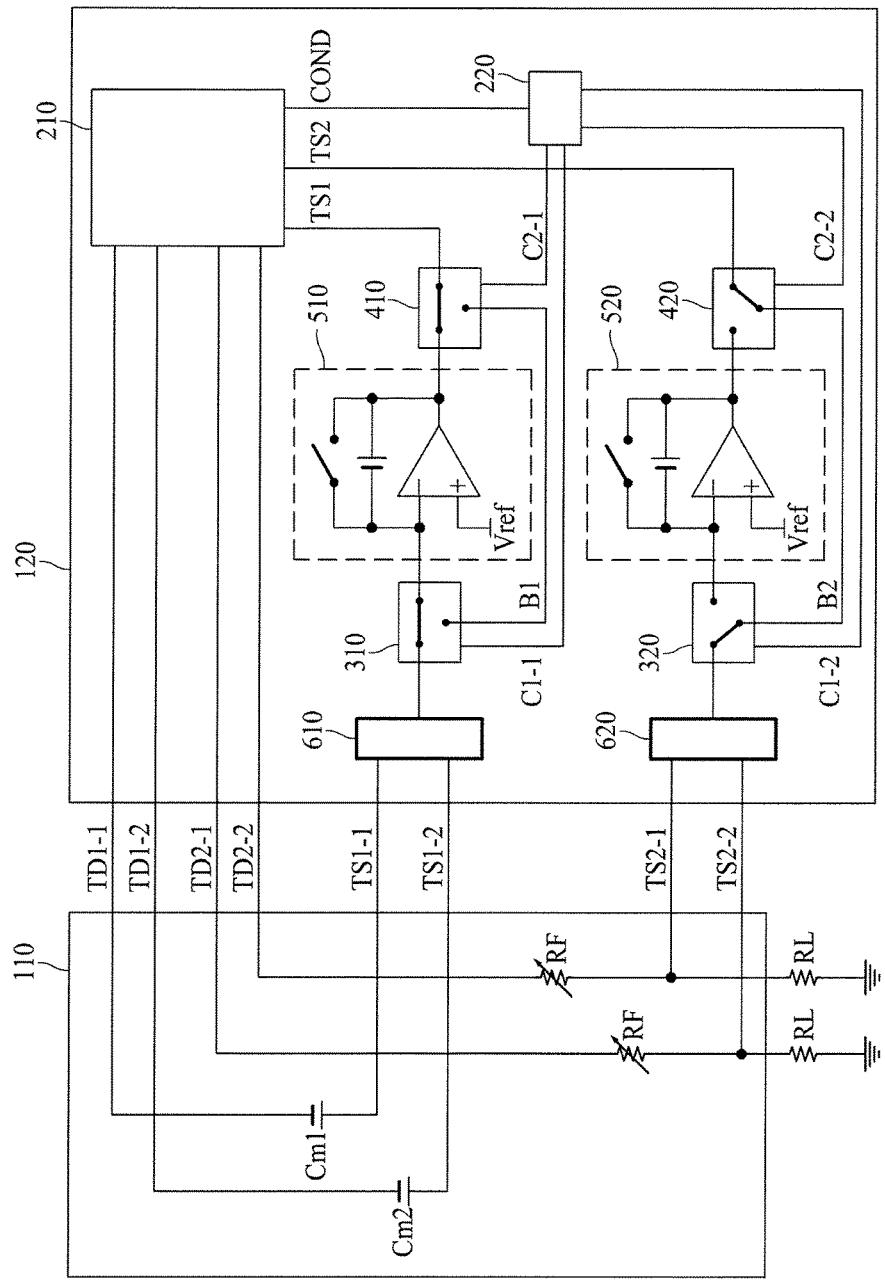
FIG. 6 is a block diagram illustrating a touch panel device according to another embodiment of the present invention.

FIG. 6 is a block diagram specifically illustrating a touch panel device 100 according to another embodiment of the present invention.

The touch panel device 100 according to this embodiment of the present invention includes a touch panel 110 and a touch panel driving device 120. Since the touch panel 110 according to this embodiment of the present invention has the same configuration and operation as the touch panel 110 described with reference to FIGS. 3A to 3C and the touch panel driving device 120 according to this embodiment of the present invention has the same configuration and operation as the touch panel driving device 120 described with reference to FIG. 4, description thereof will not be repeatedly made.

The touch panel driving device 120 according to this embodiment of the present invention includes a drive unit 210, a control unit 220, first switching units 310 and 320, second switching units 410 and 420, sensing units 510 and 520, bypass paths B1 and B2, and selection units 610 and 620. According to this embodiment of the present invention, the drive unit 210, the control unit 220, the first switching units 310 and 320, the second switching units 410 and 420, the sensing units 510 and 520, and the bypass paths B1 and B2 are the same as the drive unit 210, the control unit 220, the first switching units 310 and 320, the second switching units 410 and 420, the sensing units 510 and 520, and the bypass paths B1 and B2 of the above-mentioned embodiment of the present invention. So, description thereof will not be repeatedly made.

The selection units 610 and 620 are supplied with first touch sensing signals TS1-1 and TS1-2 from the plural first touch electrodes and are supplied with second touch sensing signals TS2-1 and TS2-2 from plural second touch electrodes. In FIG. 6, one selection unit 610 is supplied with two first touch sensing signals TS1-1 and TS1-2 and the other selection unit 620 is supplied with two second touch sensing signals TS2-1 and TS2-2, but the present invention is not limited to this configuration. One selection unit 610 may be supplied with three or more first touch sensing signals TS1 and the other selection unit 620 may be supplied with three or more second touch sensing signals TS2. Alternatively, one selection unit 610 may be supplied with the first touch sensing signal TS1 and the second touch sensing signal TS2 together and the other selection unit 620 may be supplied with two or more first touch sensing signals TS1 and two or more second touch sensing signals TS2.

The selection units 610 and 620 select one first touch sensing signal TS1 or one second touch sensing signal TS2 among the supplied first touch sensing signals TS1-1 and TS1-2 and the supplied second touch sensing signals TS2-1 and TS2-2. The selection units 610 and 620 supply the selected one first touch sensing signal TS1 or the selected one second touch sensing signal TS2 to the first switching units 310 and 320.

The touch panel device 100 according to this embodiment of the present invention further includes the selection units 610 and 620 that select one first touch sensing signal TS1 or one second touch sensing signal TS2 among the first touch sensing signals TS1 supplied from the plural first touch electrodes and the second touch sensing signals TS2 supplied from the plural second touch electrodes and supply the selected touch sensing signal to the first switching units 310 and 320. The touch panel device 100 according to this embodiment of the present invention can transmit the first touch sensing signals TS1 generated from the plural first touch electrodes and the second touch sensing signals TS2 generated from the plural second touch electrodes to the drive unit 210 via one first switching unit 310, one second switching unit 410, one sensing unit 510, and one bypass path B1. Accordingly, the touch panel device 100 according to this embodiment of the present invention can further reduce the volume and the manufacturing cost of the touch panel driving device 120.

Figure 7A:
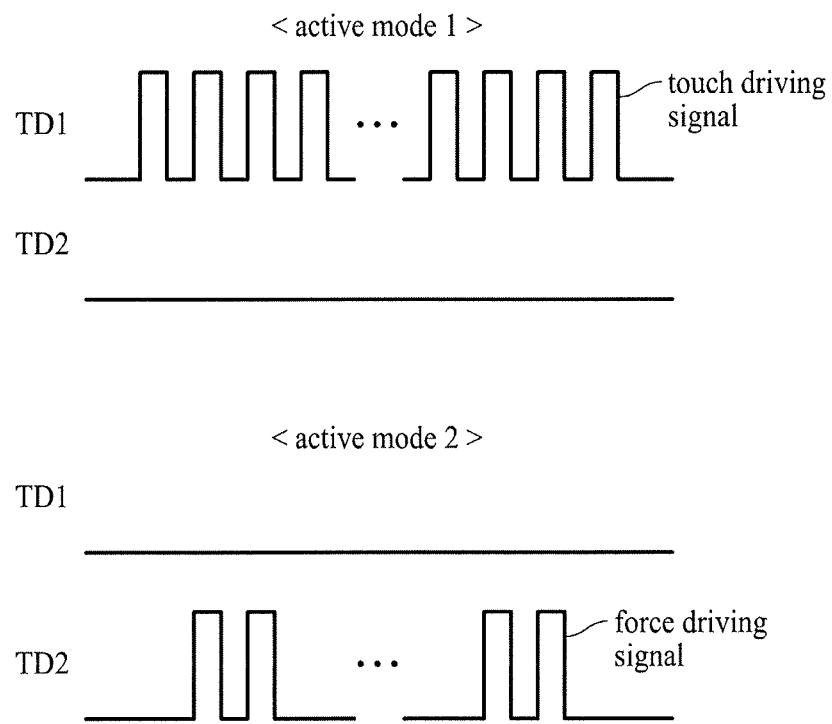
FIGS. 7A to 7C are waveform diagrams illustrating a touch panel device driving method according to an embodiment of the present invention.
Figure 7B:
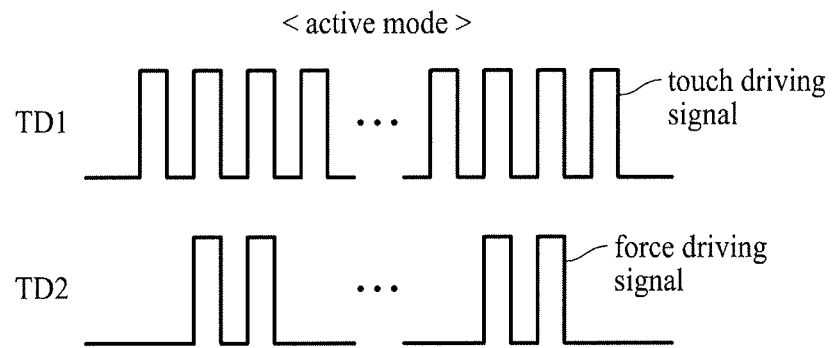
Figure 7C:
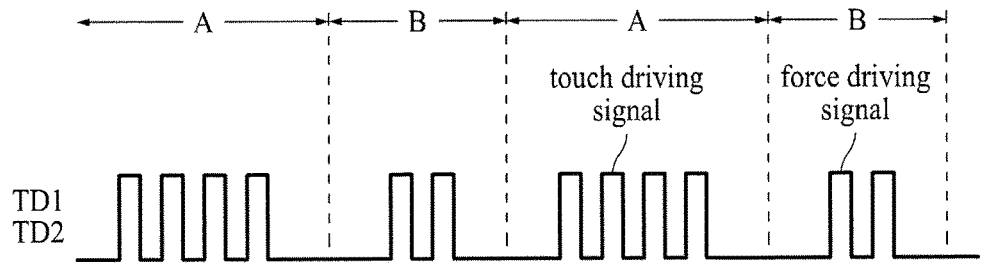

FIGS. 7A to 7C are waveform diagrams illustrating the method of driving the touch panel device 100 according to an embodiment of the present invention.

As illustrated in FIG. 7A, the control unit 220 can perform a touch position sensing operation and a touch force sensing operation by periods, which can be defined as a serial driving method. In the serial driving method, the control unit 220 drives the touch panel 110 in a first active mode or a second active mode depending on a touch in a predetermined period.

When the first touch electrodes and the second touch electrodes are separately formed, the drive unit 210 supplies a first touch driving signal TD1 to the plural first touch electrodes to perform the touch position sensing operation in the first active mode. In the second active mode, the drive unit 210 supplies a second touch driving signal TD2 to the plural second touch electrodes to perform the touch force sensing operation.

When the touch electrodes capable of performing both the touch position sensing operation and the touch force sensing operation are formed, the drive unit 210 supplies the first touch driving signal TD1 to the touch electrodes to perform the touch position sensing operation in the first active mode, and supplies the second touch driving signal TD2 to the touch electrodes to perform the touch force sensing operation in the second active mode.

The serial driving method can be applied to a case in which one touch driving signal is input to one first switching unit 310 as in one embodiment of the present invention and a case in which plural touch driving signals are selectively input to one first switching unit 310 as in another embodiment of the present invention. That is, the serial driving method can be applied to all types of touch panels 110 and all types of touch panel driving devices 120. Since the touch position sensing operation and the touch force sensing operation can be performed clearly separately, the first touch sensing signal TS1 and the second touch sensing signal TS2 can be prevented from affecting each other in the touch panel driving device 120.

As illustrated in FIG. 7B, when a touch is made in a predetermined period, the control unit 220 can drive the touch panel 110 in an active mode. At this time, in the active mode, the control unit 220 controls the drive unit 210 to supply the first touch driving signal TD1 to the plural first touch electrodes to perform the touch position sensing operation and to supply the second touch driving signal TD2 to the plural second touch electrodes to perform the touch force sensing operation.

This simultaneous driving method can be used only when the first touch electrodes and the second touch electrodes are formed separately from each other, but cannot be used when the touch electrodes capable of performing both the touch position sensing operation and the touch force sensing operation are formed. The simultaneous driving method can be used when one touch driving signal is input to the first switching unit 310 as in one embodiment of the present invention, but can be applied to only a case in which the same types of touch driving signals are input to the single first switching unit 310 when plural touch driving signals are selectively input to the first switching unit 310 as in another embodiment of the present invention.

In the simultaneous driving method, since the touch position sensing operation and the touch force sensing operation are simultaneously performed, a touch sensing operation and a force sensing operation can be performed for a short time. Since the first touch sensing signals TS1 and the second touch sensing signals can be simultaneously used and all the elements in the touch panel driving device 120 perform the sensing drive in all the sections, it is possible to enhance sensing efficiency.

As illustrated in FIG. 7C, the control unit 220 can divide a touch sustaining period of a predetermined period and can drive the touch panel 110 in an active mode A, in which an image can be displayed, or a blank mode B, in which no image is displayed or black is displayed. This method is defined as an active-blank driving method.

In the active mode A, the drive unit 210 supplies the first touch driving signal TD1 to the plural first touch electrodes to perform the touch position sensing operation. In the blank mode B, the drive unit 210 supplies the second touch driving signal TD2 to the plural second touch electrodes to perform the touch force sensing operation.

In the active-blank driving method, since the touch sustaining period which is and active period in the serial driving method is further divided and the touch panel 110 performs the touch position sensing operation and the touch force sensing operation, it is possible to perform the touch sensing operation and the force sensing operation for a short time. Even when a touch position and a touch force are variable in one active period, it is possible to accurately perform the touch sensing operation and the force sensing operation.

Figure 8:
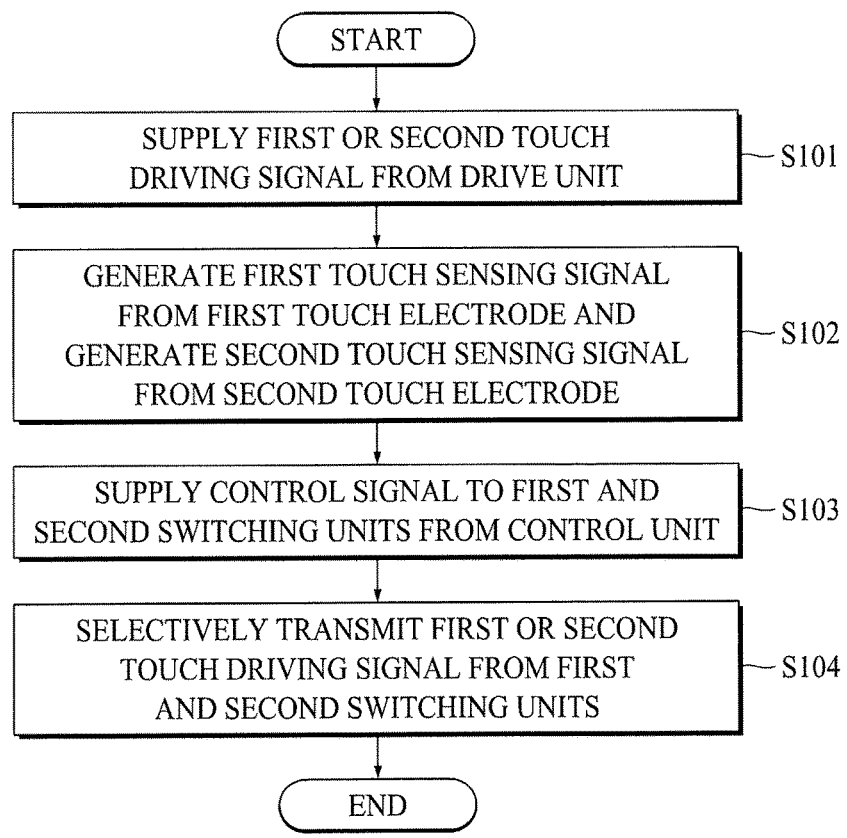
FIG. 8 is a flow diagram illustrating the touch panel device driving method according to an embodiment of the present invention.

FIG. 8 is a flowchart illustrating the method of driving the touch panel device 100 according to an embodiment of the present invention.

First, the drive unit 210 supplies the first touch driving signal TD1 for sensing a touch position to the touch panel 110 or supplies the second touch driving signal TD2 for sensing a touch force to the touch panel 110. When plural first touch electrodes for sensing a touch position and plural second touch electrodes for sensing a touch force are separately formed on the touch panel 110, the first touch driving signal TD1 and the second touch driving signal TD2 can be serially or simultaneously supplied to the first touch electrodes and the second touch electrodes, respectively. Alternatively, when touch electrodes for sensing both a touch position and a touch force are formed on the touch panel 110, the first touch driving signal TD1 and the second touch driving signal TD2 can be serially supplied to the touch electrodes (S101 in FIG. 8).

Second, the touch panel driving device 120 is supplied with the first touch sensing signals TS1 from the plural first touch electrodes or is supplied with the second touch sensing signals TS2 from the plural second touch electrodes.

For this purpose, each first touch electrode generates the first touch sensing signal TS1 using a variation in capacitance Cm therein in response to the first touch driving signal TD1. Each second touch electrode generates the second touch sensing signal TS2 using a variation in variable resistance RF therein in response to the second touch driving signal TD2 (S102 in FIG. 8).

In the touch panel driving device 120 according to one embodiment, the first switching units 310 and 320 are supplied with the first touch sensing signals TS1 or the second touch sensing signals TS2. In the touch panel driving device 120 according to another embodiment, the selection units 610 and 620 are supplied with the first touch sensing signals TS1-1 and TS1-2 or the second touch sensing signals TS2-1 and TS2-2, and the selection units 610 and 620 transmit one touch sensing signal among the first touch sensing signals TS1-1 and TS1-2 or the second touch sensing signals TS2-1 and TS2-2 to the first switching units 310 and 320.

Third, the first touch sensing signals TS1 are supplied to the drive unit 210 via the sensing units 510 and 520 in response to the (1-1)-th control signal C1-1 and the (2-1)-th control signal C2-1 supplied from the control unit 220, or the second touch sensing signals TD2 are supplied to the drive unit 210 via the bypass paths B1 and B2 not passing through the sensing units 510 and 520 in response to the (1-2)-th control signal C1-2 and the (2-2)-th control signal C2-2 supplied from the control unit 220.

When the first touch sensing signals TS1 are supplied, the control unit 220 supplies the (1-1)-th control signal C1-1 to the first switching units 310 and 320 and supplies the (2-1)-th control signal C2-1 to the second switching units 410 and 420. When the second touch sensing signals TS2 are supplied, the control unit 220 supplies the (1-2)-th control signal C1-2 to the first switching units 310 and 320 and supplies the (2-2)-th control signal C2-2 to the second switching units 310 and 320 (S103 in FIG. 8).

When the control signal C-2 is supplied, the first switching units 310 and 320 are connected to input terminals of the sensing units 510 and 520. When the (2-1)-th control signal C2-1 is supplied, the second switching units 410 and 420 are connected to output terminals of the sensing units 510 and 520. Accordingly, the first touch sensing signals can be supplied to the drive unit 210 via the sensing units 510 and 520.

When the control signal C-2 is supplied, the first switching units 310 and 320 are connected to ends of the bypass paths B1 and B2. When the (2-2)-th control signal C2-2 is supplied, the second switching units 410 and 420 are connected to the other ends of the bypass paths B1 and B2. Accordingly, the second touch sensing signals TS2 can be supplied to the drive unit 210 via the bypass paths B1 and B2 not passing through the sensing units 510 and 520 (S104 in FIG. 8).

Fourth, a touch position is sensed using the first touch sensing signals TD1 and a touch force is sensed using the second touch sensing signals TD2. The control unit 220 collects and analyzes the first touch sensing signals TS1 as the sensing result from the drive unit 210 and senses a touch and a touch position. The control unit 220 collects and analyzes the second touch sensing signals TS2 as the sensing result from the drive unit 210 to sense a pressures applied to a touched electrode.

The first touch sensors and the second touch sensors can be arranged step by step as follows. The method of driving the touch panel device including the first touch sensors for a touch position sensing operation and the second touch sensors for a touch force sensing operation includes: connecting the first touch sensors to the sensing units; sensing the first touch sensing signals from the first touch sensors via the sensing units and supplying the first touch sensing signals to the control unit; causing the control unit to calculate a touch position using the first touch sensing signals; connecting the second touch sensors to the control unit via the bypass paths which do not pass through the sensing units; and causing the control unit to sense the second touch sensing signals from the second touch sensors and to calculate a touch force using the second touch sensing signals.

In the method of driving the touch panel device 100 according to an embodiment, the second touch sensing signals TS2 are transmitted to the drive unit 210 via the bypass paths B1 and B2 not passing through the sensing units 510 and 520. Accordingly, the touch panel device 100 according to an embodiment of the present invention can perform both the touch sensing operation using the first touch sensing signals TS1 and the force sensing operation using the second touch sensing signals TS2 through the use of the single drive unit 210 and can prevent an erroneous touch sensing signal TS2 from being transmitted to the drive unit 210 due to the sensing units 510 and 520, thereby easily performing the force sensing operation.

It will be able to be understood by those skilled in the art that the present invention can be modified and corrected in various forms without departing from the technical concept of the present invention. Therefore, the technical scope of the present invention is not limited to details described in the detailed description, but should be defined by the appended claims.

What is claimed is:

1. A touch panel device comprising:
    a touch panel including a first touch sensor for a touch position sensing operation and a second touch sensor for a touch force sensing operation; and
    a touch panel driving device connected to the touch panel, wherein the touch panel driving device further includes:
        a drive unit configured to supply a first touch driving signal to the first touch sensor and a second touch driving signal to the second touch sensor,
        a sensing unit configured to sense a first touch sensing signal from the first touch sensor,
        a control unit configured to calculate a touch position using the first touch sensing signal and calculate a touch force by sensing a second touch sensing signal from the second touch sensor, and
        a switching unit configured to connect the first touch sensor to the sensing unit or connect the second touch sensor to the touch panel via a bypass path which does not pass through the sensing unit.

2. The touch panel device according to claim 1, wherein the switching unit includes:
    a first switching unit that is supplied with the first touch sensing signal and the second touch sensing signal and, wherein the first switching unit is connected to an input terminal of the sensing unit in response to a first control signal supplied from the control unit, and is connected to one end of the bypass path in response to a second control signal supplied from the control unit; and a second switching unit connected to an output terminal of the sensing unit in response to the first control signal, and connected to another end of the bypass path in response to the second control signal.

3. The touch panel device according to claim 1, wherein the control unit is further configured to:

receive the first touch signal amplified by the sensing unit and supply the second touch sensing signal to the drive unit via the bypass path which does not pass through the sensing unit; and receive the second touch signal amplified by the sensing unit and supply the first touch sensing signal to the drive unit via the bypass path which does not pass through the sensing unit.

4. The touch panel device according to claim 3, wherein the first touch sensor for the touch position sensing operation and the second touch sensor for the touch force sensing operation both share a same first touch electrode.

5. The touch panel device according to claim 1, wherein the touch panel driving device further includes a selection unit configured to select a touch sensing signal among a plurality of first touch sensing signals and supply the selected touch sensing signal to the switching unit.

6. The touch panel device according to claim 1, wherein the control unit is further configured to:

drive the touch panel in a first active mode or a second active mode depending on a touch in a predetermined period, perform the touch position sensing operation in the first active mode, and perform the touch force sensing operation in the second active mode.

7. The touch panel device according to claim 6, wherein the first touch sensor for the touch position sensing operation and the second touch sensor for the touch force sensing operation both share a same first touch electrode.

8. The touch panel device according to claim 1, wherein the control unit is further configured to:

drive the touch panel in an active mode depending on a touch in a predetermined period, and perform both the touch position sensing operation and the touch force sensing operation in the active mode.

9. The touch panel device according to claim 8, wherein the first touch sensor for the touch position sensing operation includes a first touch electrode, and the second touch sensor for the touch force sensing operation includes a second touch electrode separate from the first touch electrode.

10. The touch panel device according to claim 1, wherein the control unit is further configured to:

divide a touch sustaining period of a predetermined period of time and drive the touch panel in an active mode or a blank mode, perform the touch position sensing operation in the active mode, and perform the touch force sensing operation in the blank mode.

11. A method of driving a touch panel device including a first touch sensor for a touch position sensing operation and a second touch sensor for a touch force sensing operation, the method comprising:

connecting the first touch sensor to a sensing unit;

sensing a first touch sensing signal from the first touch sensor via the sensing unit and supplying the first touch sensing signal to a control unit;

calculating, via the control unit, a touch position using the first touch sensing signal;

connecting the second touch sensor to the touch panel via a bypass path which does not pass through the sensing unit;

sensing, via a driving unit, a second touch sensing signal from the second touch sensory; and calculating, via the control unit, a touch force using the second touch sensing signal.

12. The method of driving the touch panel device according to claim 11, further comprising:

driving the touch panel in a first active mode or a second active mode depending on a touch in a predetermined period;

performing the touch position sensing operation in the first active mode; and performing the touch force sensing operation in the second active mode.

13. The method of driving the touch panel device according to claim 11, further comprising:

driving the touch panel in an active mode depending on a touch in a predetermined period; and performing both the touch position sensing operation and the touch force sensing operation in the active mode.

14. The method of driving the touch panel device according to claim 11, further comprising:

dividing a touch sustaining period of a predetermined period of time and driving the touch panel in an active mode or a blank mode;

performing the touch position sensing operation in the active mode; and performing the touch force sensing operation in the blank mode.

15. A one-chip touch panel driving device comprising:

a drive unit configured to output a first touch driving signal and a second touch driving signal and receive a first touch sensing signal and a second touch sensing signal;

a switching unit configured to supply the first touch sensing signal to the drive unit via a sensing unit or supply the second touch sensing signal to the drive unit via a bypass path which does not pass through the sensing unit; and a control unit configured to sense a touch position using the first touch sensing signal, sense a touch pressure using the second touch sensing signal, and control operations of the drive unit and the switching unit.

16. The one-chip touch panel driving device according to claim 15, wherein one end of the bypass path is disposed at an input side of the sensing unit and another end of the bypass path is disposed an output side of the sensing unit.

17. The one-chip touch panel driving device according to claim 15, wherein the sensing unit is configured to amplify the first touch sensing signal or the second touch sensing signal.

18. The one-chip touch panel driving device according to claim 15, wherein the sensing unit includes a first sensing unit and a second sensing unit, wherein the switching unit includes a first switch disposed at an input side of the first sensing unit, a second switch disposed at an output side of the first sensing unit, a third switch disposed at an input side of the second sensing unit, and a fourth switch disposed at an output side of the second sensing unit, and wherein the bypass path includes a first bypass path including one end configured to connect to the input side of the first sensing unit via the first switch and another end configured to connect to the output side of the first sensing unit via the second switch, and a second bypass path including one end configured to connect to the input side of the second sensing unit via the third switch and another end configured to connect to the output side of the second sensing unit via the fourth switch.

19. The one-chip touch panel driving device according to claim 15, wherein the control unit is further configured to:
sense the touch position based on the first touch signal amplified by the sensing unit and supply the second touch sensing signal to the drive unit via the bypass path which does not pass through the sensing unit; and
sense the touch pressure based on the second touch signal amplified by the sensing unit and supply the first touch sensing signal to the drive unit via the bypass path which does not pass through the sensing unit.

* * * * *